United States Patent

Harris et al.

Patent Number: 6,164,531
Date of Patent: Dec. 26, 2000

[54] USER INTERFACE CARD FOR USE WITH A DEVICE

[75] Inventors: Daryl Harris, Chicago; Daniel L. Williams, Vernon Hills, both of Ill.

[73] Assignee: Motorola, Inc., Shaumburg, Ill.

[21] Appl. No.: 09/008,417

[22] Filed: Jan. 16, 1998

[51] Int. Cl.[7] .................................................. G06K 5/00
[52] U.S. Cl. ........................... 235/380; 235/38; 235/492; 361/737; 379/444; 455/90
[58] Field of Search ........................ 235/38, 492; 455/90; 361/737, 736, 814; 379/444

[56] References Cited

U.S. PATENT DOCUMENTS

| | | | |
|---|---|---|---|
| 5,109,540 | 4/1992 | Dzung et al. | 455/89 |
| 5,325,429 | 6/1994 | Kurgan | 379/429 |
| 5,436,969 | 7/1995 | Kobayashi | 379/433 |
| 5,584,054 | 12/1996 | Tyneski et al. | 455/89 |
| 5,606,594 | 2/1997 | Register et al. | 379/58 |
| 5,661,641 | 8/1997 | Shindo | 361/814 |
| 5,664,228 | 9/1997 | Mital | 395/882 |

FOREIGN PATENT DOCUMENTS

| | | |
|---|---|---|
| 0347897A1 | 12/1989 | European Pat. Off. . |
| 3610202A1 | 10/1986 | Germany . |
| 4-273639 | 9/1992 | Japan . |
| 5-30166 | 2/1993 | Japan . |
| 2313734 | 12/1997 | United Kingdom . |
| 94/13088 | 6/1994 | WIPO . |

OTHER PUBLICATIONS

StarTAC User's Manual, Motorola, Inc., Nov. 1996, 70 pages.

*Primary Examiner*—Donald Hajec
*Assistant Examiner*—Jamara Franklin
*Attorney, Agent, or Firm*—Randall S. Vaas; Michael C. Soldner

[57] ABSTRACT

A card (922) comprises a body (909). A connector (522) is carried on the body for coupling to a communication device (900). A user interface including a keypad (926) is carried on the body and coupled to the connector. An identity circuit (904) is coupled to the connector. The identity circuit can be a GSM SIM. The card can include an aperture (924) for alignment with a display on a device with which the card is used.

6 Claims, 7 Drawing Sheets

USER INTERFACE CARD FOR USE WITH A DEVICE

FIELD OF THE INVENTION

The present invention pertains to portable communication devices that accommodate a removable user interface card.

BACKGROUND OF THE INVENTION

Electronic devices are known which operate with a portable, removable user card having an integral microprocessor, a memory element, or both. Examples of such electronic devices include automated teller machines (ATM), pagers, personal digital assistants (PDA), and radiotelephones, such as cellular telephones and cordless telephones. Examples of removable user cards include a subscriber identity module (SIM) which is used in portable cellular telephones to communicate with a base station under specifications such as the Global System for Mobile Communication (GSM) specification. Other examples of removable user cards include electronic debit cards (electronic cash), and bank or credit cards.

A difficulty in providing electronic devices that operate with a removable portable user card is that the cards and the portable electronic devices each have different optimum size criteria. It is desirable for the user cards to be the size of a standard bank card of the type used with an ATM. Although these user cards are small enough to be carried in wallets and purses, they are sufficiently large that people do not typically lose them.

Portable electronic devices must be small enough that people can easily transport them. This is particularly true for pagers, cellular telephones, and PDAs, where portability is a principal design objective. Preferably, a portable device fits easily into a shirt pocket or purse, or clips onto a person's belt, without discomfort to the wearer.

A limiting factor in reducing the size of portable communication devices is that the user interface must be sufficiently large that people enjoy using the device. A user interface employing a keypad must be large enough that a user routinely presses only the desired key when entering information via the keypad. A display needs to be large enough that it is easily read. Meeting these criteria in ever shrinking devices is an increasing challenge to industrial designers.

An additional difficulty is that although people desire smaller devices, they desire that these devices perform more functions. People like to carry as few devices as possible. Thus the ability to carry a single electronic device to provide all personal communication needs, such as paging and cellular communication, as well as connectivity with network systems such as banking systems, investment networks, and the internet, is considered desirable.

It is therefor highly desirable to achieve more versatile portable communication devices having smaller sizes even though the cards with which they are used remain a larger standard size. Because an effective solution has not been found for accommodating cards in a device smaller than the card, the size of the cards has become a limiting factor in the efforts to make devices smaller. Although designers can choose not to use certain cards, the functionality of the device is restricted if it can not use all common, standard sized cards.

Therefor, it is desirable to provide cards that provide more flexibility for readily portable devices.

DETAILED DESCRIPTION OF THE DRAWINGS

Figure 5:
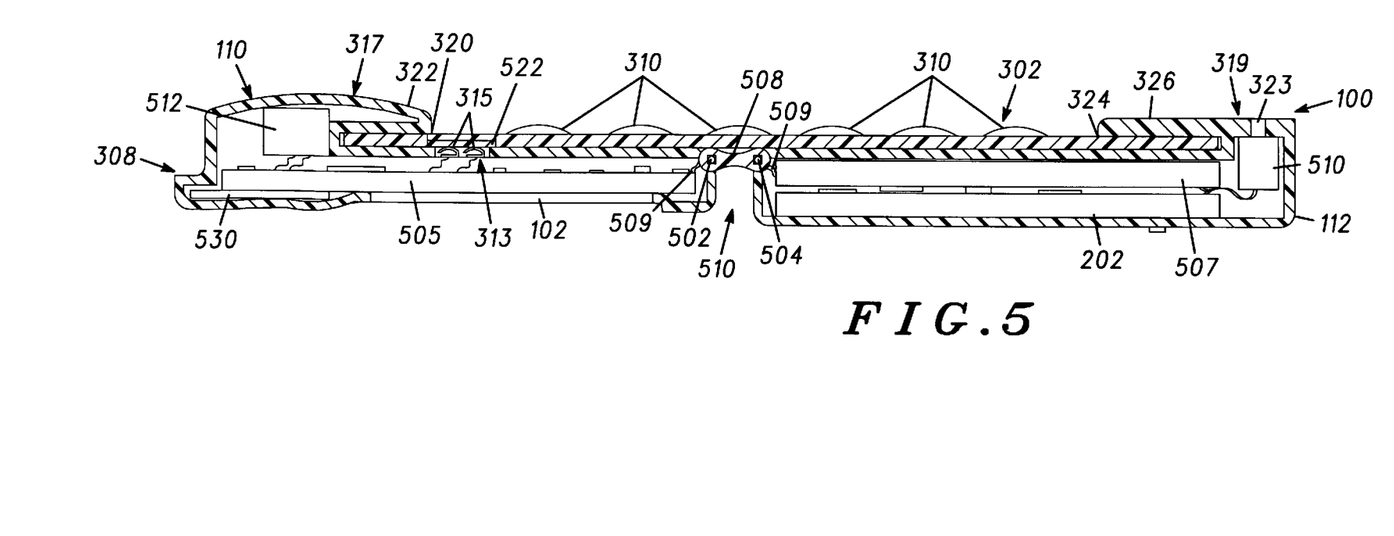
FIG. 5 is a cross sectional view taken along plane 5—5 in FIG. 4.
Figure 6:
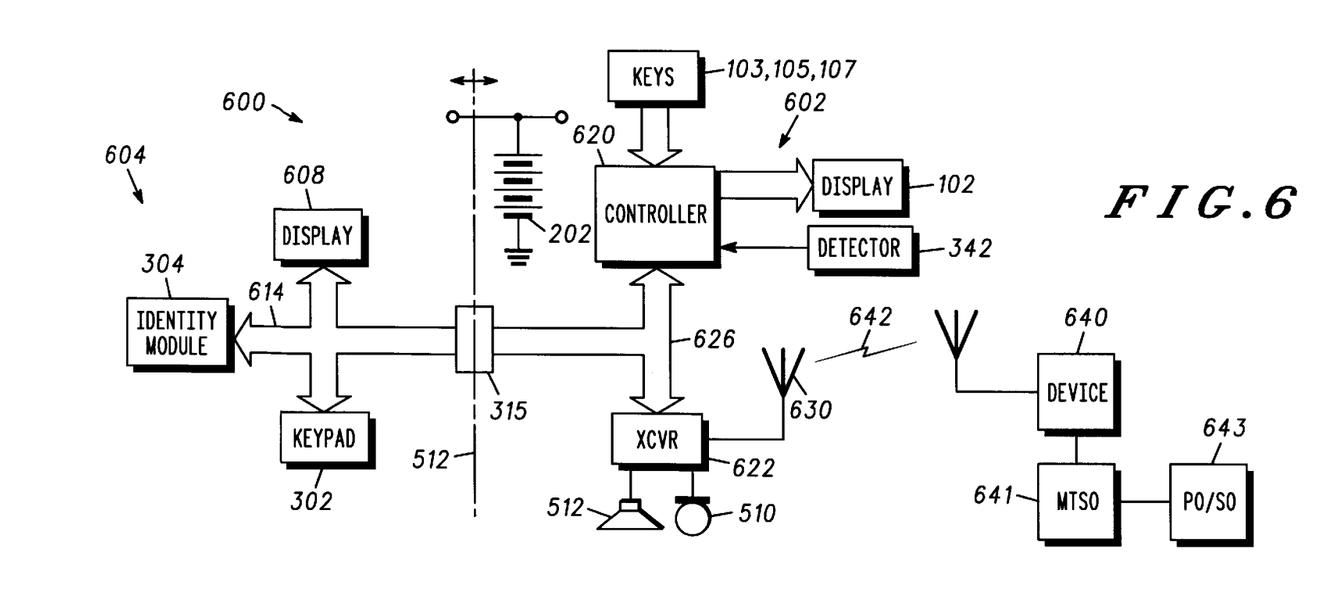
FIG. 6 is circuit schematic in block diagram form illustrating the user interface card attached to the portable communication device and coupled via a communication path to a remote device.

A card 300, 922 (FIGS. 3 and 9) comprises a body 301, 909. A connector 522 is carried on the body for coupling to a communication device 900. A user interface including a keypad 926 is carried on the body and coupled to the connector. An identity circuit 904 is carried on the body. The identity circuit can be a SIM or a memory circuit. The identity circuit is connected to a connector 522 (FIGS. 5 and 6). The user interface card 922 includes an aperture 924 for alignment with a display on a device 900 with which the card is used.

When device 100, 900 is opened, the removable user interface card 300, 922 (FIGS. 3, 4 and 9) can be inserted. The user interface keypad 302, 926 is used to place an outgoing call. A card for use with a very compact communication device 100 is thus disclosed. User interface card 300, 922 has a large surface area to accommodate a full size user interface. The card thus allows the communication device 100 to be provided with a user friendly interface even though the communication device is very compact in size when stored.

As used herein, "user interface" means the elements in the device that interface with the user, permitting the user to receive information or allow the user to control device operation. The user interface includes, for example, a display and keypad on most radio telephones. Those skilled in the art will recognize that the user interface can include other, or different, input and output elements.

Figure 1:
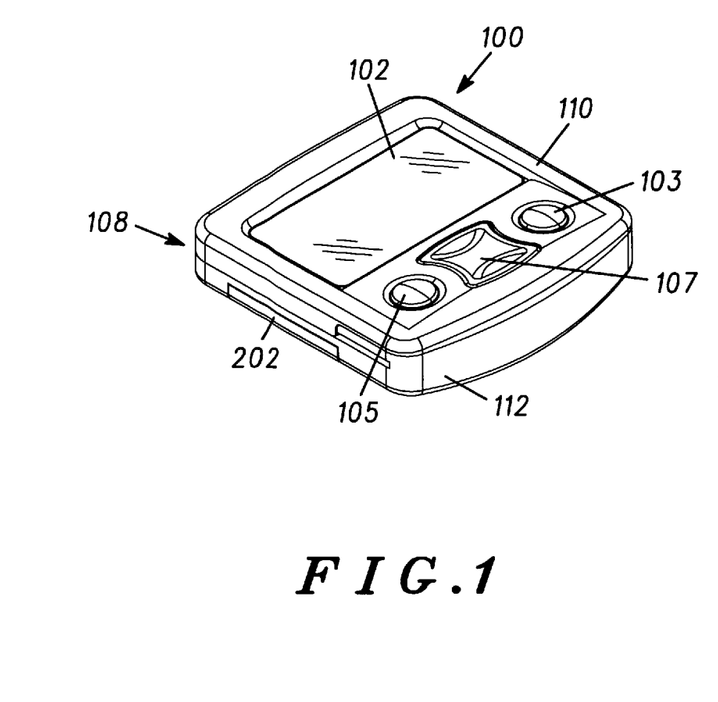
FIG. 1 is a bottom, front and left side perspective view illustrating a portable communication device in a closed storage position.
Figure 2:
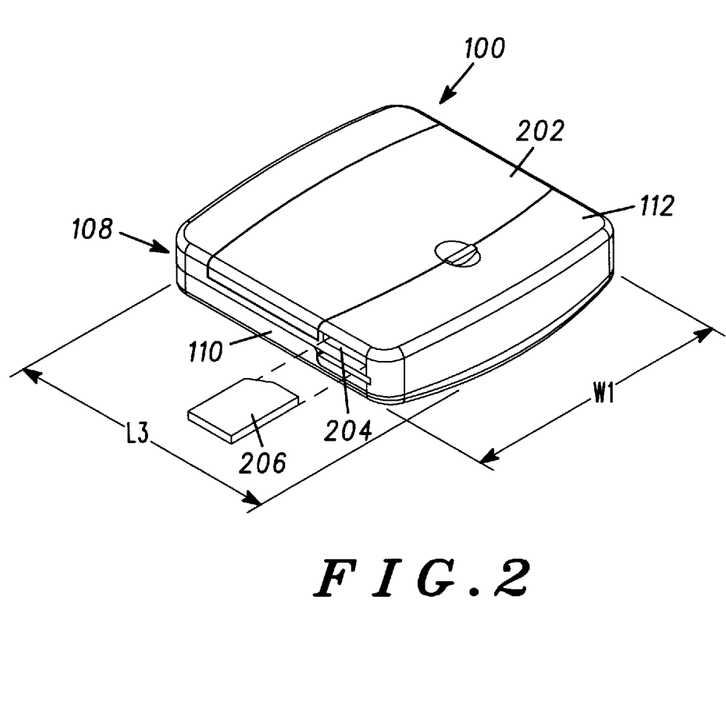
FIG. 2 is a bottom, back and right side perspective view illustrating the portable communication device according to FIG. 1.

The communication device 100 is illustrated in a closed, or collapsed, position in FIG. 1. The communication device 100 includes a housing 108. Device housing 108 includes a first housing section 110 and a second housing section 112. A battery 202 (FIG. 2) is removable mounted in housing section 112. The battery 202 provides power for circuitry of communication device 100, in a conventional manner. An optional slot 204 for a small SIM card 206 can be provided.

A display 102 and keys 103, 105 and 107, which are visible on the front exterior surface of the communication device 100 in the closed storage position, are carried on the exterior of housing 108. Page messages and call information, such as the caller's identification (ID), are displayed on display 102. Keys 103, 105 and 107 are used to control operation of the communication device 100 while it is closed.

The first housing section 110 houses a speaker 512 (FIG. 5) in speaker housing 317. The speaker housing 317 projects outwardly from the first housing section 110. The speaker housing 317 (FIG. 3) includes an aperture 321 to pass sound from a speaker therein and a groove 320 extending under an overhang 322 thereof to engage a user interface card. The first housing section 110 is of any suitable construction, such as molded from an organic polymer.

Figure 3:
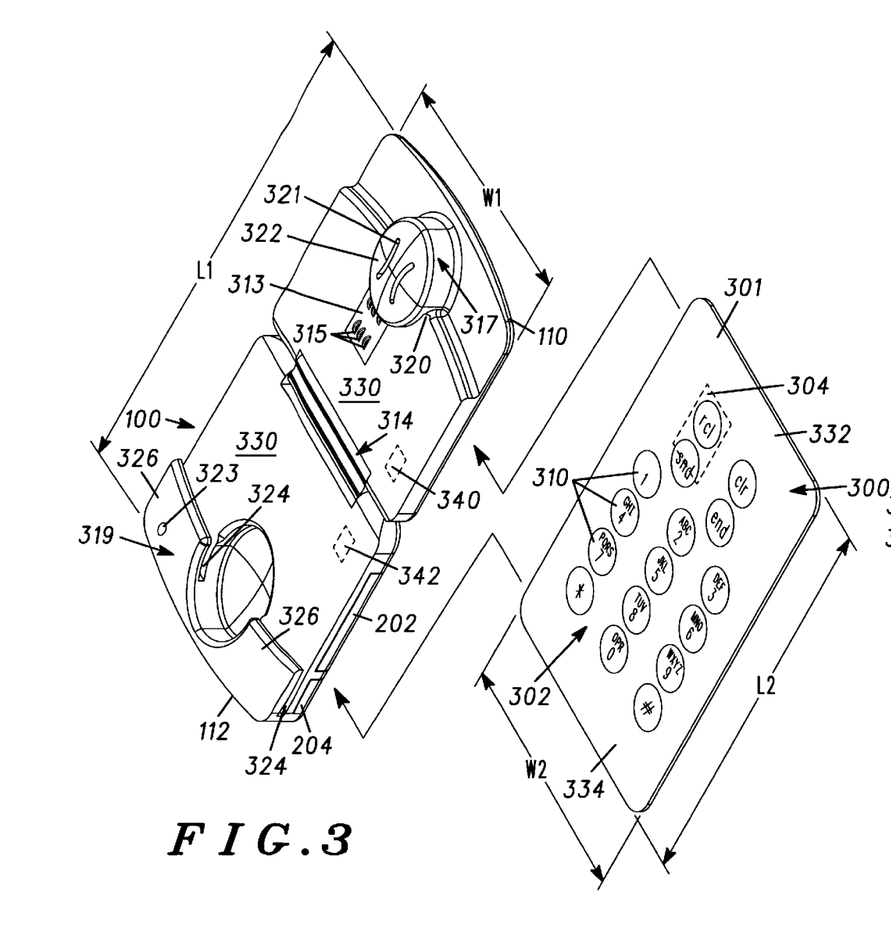
FIG. 3 is a front perspective view illustrating the communication device according to FIG. 1 in the open position with a user interface card removed.

The second housing section 112 houses a microphone 510 in microphone housing 319. The microphone housing 319 projects outwardly from the housing section 112. The microphone housing 319 includes an aperture 323 to pass sound to a microphone therein and a groove 324 extending under an overhang 326 thereof to engage a user interface card. The first housing section 112 is of any suitable construction, such as molded from an organic polymer.

As best illustrated in FIGS. 3 and 5, the first and second housing sections 110 and 112 are movingly interconnected by a mechanical connector 314 (FIG. 3). For example, the mechanical connector 314 connecting first and second housing sections 110 and 112 is a double hinge on which the housing sections pivot. The double hinge, comprises a first housing section pivot axle 502 (FIG. 5) in first housing section 110 and a second housing section pivot axle 504 in second housing section 112. A moving mechanical connector body 508 is carried on the first and second housing section pivot axles 502, 504 to pivot around each of the axles.

The first housing section and second housing section pivot axles 502, 504 are of any suitable manufacture such as a metal cylindrical rod, which is supported in the first and second housing sections. Alternatively, the first and second housing section pivot axles 502, 504 may each be provided by two integral cylindrical snap connectors (not shown) having a common center axis. It is envisioned that the snap connectors are snapped into openings (not shown) in the first and second housing sections 110, 112, such that they rotate therein. Those skilled in the art will recognize that other equivalent means can be used to provide the pivot axle for the double hinge. By using a double hinge, the hinge can be made small, allowing the phone to be smaller, but having a favorable pivot rotation.

Although a hinge is illustrated, those skilled in the art will recognize that housing sections 110 and 112 can be interconnected by other mechanisms. For example, a sliding rail arrangement, an elastic member, or the like, can be used to connect these housing sections.

The speaker housing 317 (FIG. 3) and microphone housing 319 extend outwardly beyond a planar surface 330 on the inside of housing 108 to receive a user interface card 300. User interface card 300 is received on the planar surface 330 on the inside of the communication device 100 when it is open. Opposite ends 332, 334 (FIG. 4) of user interface card 300 are received inside grooves 320, 324 on the speaker and microphone housings 317, 319.

It is envisioned that flat springs (not shown) can be mounted in the grooves to engage the ends of the card. The springs push the housing outwardly away from the ends of the card to hold the housing 108 in the open use position. The overhangs 322, 326 of the speaker and microphone housings 317, 319 also hold the housing 108 in its fully open use position shown in FIG. 5 thus preventing the housing from being closed when user interface card 300 is inserted.

The speaker housing 317 and microphone housings 319 thus provide outwardly extending projections on opposite ends of the communication device 100 in the open position. By providing projections on opposite ends of the open communication device, the open housing is not much longer than the card. This permits the device to be approximately half the length of the card is in the closed position.

More particularly, with reference to FIG. 3, the communication device 100 has a length L1, when open, of 70 to 100 millimeters, and a width W1 of 40 to 60 millimeters. The user interface card 300 has a length L2 of 60 to 95 millimeters, and a width W2 of 40 to 60 millimeters. The card is thus shorter than the open housing, and has approximately the same width. When folded, the length L3 (FIG. 2) of the housing is half of its open length. Thus the folded length L3 is 35 to 50 millimeters, and is substantially shorter than the length of the closed housing. For example: L1 can be 90 millimeters; L2 can be 85 millimeters; L3 can be 45 millimeters; and W1 and W2 can be 55 millimeters. Those skilled in that art will recognize that the actual length can be different, but preferably, the length of the open communication device 100 is not substantially longer than the length of the user interface card 300. In any case a very compact communication device is provided that accommodates a large card having a large surface area for the user keypad.

To close housing 108, if user interface card 300 is inserted, the card is removed. The first and second housing sections 110, 112 are pivoted to the closed storage position. The upwardly extending speaker housing 317 is received into a groove 320 in second housing section 112. The microphone housing 319 includes two projecting members on opposite sides of groove 320. The microphone housing 319 members are received into the first housing section on opposite sides of the speaker housing as the device is folded to the closed storage position. Thus the speaker housing 317 is interleaved between members of microphone housing 319 when communication device 100 is closed. This interleaving permits the collapsed device to have a small profile while having outwardly extending housing members under which the user interface card 300 is received. Additionally, the speaker housing 317 can be positioned at the user's ear to provide tactile feedback of proper alignment of the ear piece.

A magnet 340 is located in first housing section 110 and a reed switch 342 is positioned in second housing section 112. The magnet 340 and reed switch 342 are positioned in the housing such that closing the housing 108 moves the magnet in first housing section 110 to a position to close reed switch 342 in the other housing section. Opening of the housing is detected when the magnet 340 moves away from the reed switch 342, causing the reed switch 342 to open. Those skilled in the art will recognize that any suitable mechanism can be used to detect the open and closed positions of the housing sections, such as a mechanical switch physically actuated by movement of the housing sections.

The communication device 100 is moved to the extended open use position illustrated in FIG. 3 to affect cellular radiotelephone operation. Radiotelephone calls are answered by opening the housing 108. A call can be received and the conversation carried out without inserting user interface card 300. The call is terminated by closing the phone, which is detected by reed switch 342 closing.

The user interface card 300 (FIG. 3) includes a keypad 302, and an identity circuit 304, such as a subscriber identity module (SIM) of the type used in GSM systems, mounted in a card body 301. The identity circuit 304 is shown in dotted lines as it is within the card body 301. With the communication device open, card reader contacts 315 are accessible for contacting complementary contacts associated with electrical connector 522 on user interface card 300. The electrical connector 522 (FIG. 5) includes contacts (not shown) for electrical connection with electrical contacts 315 of electrical connector, or card reader, 313. The card electrical connector 522 is carried on card body 301. In the illustrated embodiment, the electrical connector 522 associated with the identity circuit 304 is positioned to abut with electrical connector, or card reader, 313 when the user interface card 300 is inserted into communication device 100.

The keypad 302 is manually actuated by a user to enter a telephone number to be called and for entry of other control information, such as send, end, recall, and clear commands. These commands will be recognized by those familiar with cellular telephone operation, and the device operation is standard cellular telephone operation. The display 102 (FIG. 1) displays the telephone number dialed and other user feedback signals while the user dials or enters control signals into the communication device 100 via keypad 302 (FIG. 3). The identity circuit 304 is a microprocessor circuit of the type used in GSM systems, a memory module of the type used in debit cards, or any other suitable card type.

It will be recognized that cellular operation under the existing GSM specification requires that a SIM card be positioned in communication device 100. The user interface card 300 can include the SIM, where the identity circuit 304 is for example a bank card, or the user interface card 300 may be used in addition to a separate, optional, small SIM card 206 (FIG. 2) removably stored in communication device 100. Such small SIM cards are approximately the same size as the dotted line dimensions of identity circuit 304 (FIG. 3). Regardless of whether the identity circuit 304 is in user interface card 300 or card 206, keypad 302 is used to dial a number when the user interface card 300 is inserted into communication device 100. The keypad 302 is used to enter the address, or telephone number, of the called party. The user interface card 300 can thus consist of the keypad, or it can consist of a memory module and keypad, or it can include the identity circuit 304.

Figure 4:
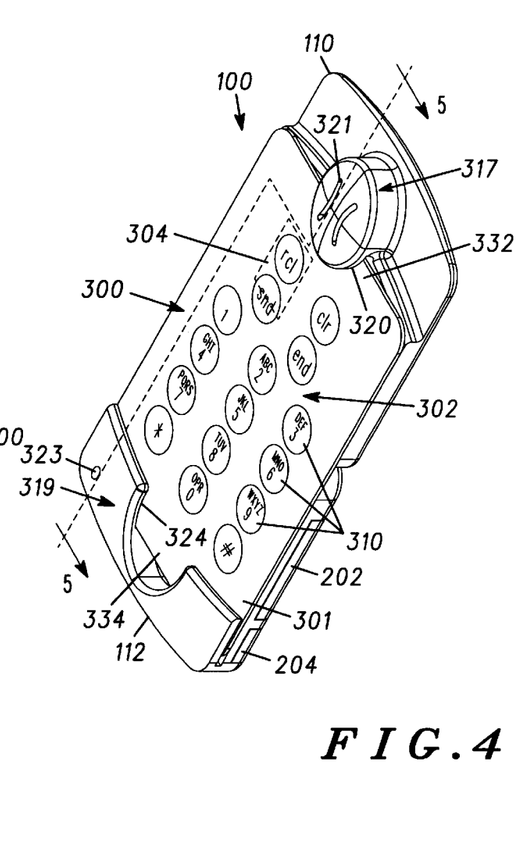
FIG. 4 is a front perspective view illustrating the open communication device of FIG. 3 with the user interface card attached.

With the user interface card 300 fully inserted into the communication device 100, as illustrated in FIG. 4, the communication device 100 is a fully operational cellular radiotelephone. The communication device 100 includes circuitry to provide wireless communication with a remote device, as will be described in greater detail herein below.

FIG. 6 shows a circuit 600, which is in communication device 100 and user interface card 300. Circuit 600 includes a communication device circuit 602 and user interface card circuit 604. The user interface card circuit 604 includes keypad 302 and an identity circuit 304 connected to card electrical connector 522 via a bidirectional data bus 614. An optional additional display 608 can be provided in user interface card 300.

The communication device circuit 602 includes a controller 620 to control the operation of the communication device 100, and may be implemented using any suitable means such as a microprocessor, microcontroller, digital signal processor, programmable logic unit, or the like. The controller 620 and transceiver 622 are connected to electrical, or card reader, 313 via bidirectional data bus 626. Transceiver 622 is connected to an antenna 630. Transceiver 622 can be implemented using any suitable communication circuit, such as a data modem, a wireless (RF) transceiver for wireless communication, or the like. Signals are communicated with a remote communication device 640 via antenna 630 over a wireless communication channel 642. Alternatively, the antenna could be a plug for connection to a wire line. The communication device 100 also includes a microphone 510 and a speaker 512 for bidirectional voice communication. Circuit 600 is powered by battery 202.

In the illustrated embodiment, the communication device 640 (FIG. 6) is a base station. The communication device 640 is connected to a Mobile Telephone Switching Office (MTSO) 641. The MTSO 641 is in turn connected to a plain old telephone switching office (POTSO) 643. Those skilled in the art will recognize that the communication device 640 communicates with portable communication device 100 over wireless communication channel 642. The MTSO provides a connection with the land line telephone system POTSO 643 whereby the wireless device can communicate with land line telephones.

With reference now to FIG. 5, a circuit board 505 and circuit board 507 are interconnected by cable 509 which extends through mechanical connector 314. Popples 310 of the keypad 302 are aligned with contacts (not shown) connected to electrical connector 522. Electrical connector 522 is connected to contacts 315 of device electrical connector, or card reader, 313. Contacts 315 of electrical connector 313 are connected to the printed circuit board 505. Other circuitry of the communication device 100, including controller 620 and transceiver 622, are mounted on printed circuit boards 505 and 507.

The user interface card 300 is inserted into communication device 100 when the communication device is open. The card slides under a speaker housing 317 in which the speaker 512 is mounted and microphone housing 319 in which the microphone 510 is mounted. The groove 320 in speaker housing 317, the groove 324 in microphone housing 319, and device electrical connector 313, comprise a quick-disconnect connector. The quick-disconnect connector temporarily receives the card and engages the ends of the cards but permits easy removal thereof.

When the user interface card 300 is engaged by the housing sections, the housing is held in the open use position until the card is removed. While held in the open use position, the card is used to dial a telephone number to be called, input control commands, and thus provides user interface functions. Additionally, because the cards has a substantially larger surface area than any single face of the first housing section 110 and second housing section 112, the keys can be significantly larger than can be accommodated directly on the housing 108.

In the closed storage position (FIGS. 1 and 2), the communication device 100 according to one embodiment of the invention operates as a pager and receives wireless radiotelephone calls. To affect pager control, keys 103, 105 and 107 are operated in a manner that provides menu scrolling, message display, and pager control. More particularly, when key 103 is actuated, controller 620 controls the display 102 to generate a receive message that is displayed on display 102. When key 107 is actuated, controller 620 controls the display to sequentially scroll through a pager menu on display 102 such that one function is displayed at a time. When key 105 is actuated, the controller selects the one function displayed on display 102.

When the communication device 100 receives a cellular phone call, the incoming caller's identification, either telephone number or name, is displayed on display 102. The user can answer the call by opening the communication device 100 to the position illustrated in FIG. 3.

Connection of electrical connector 522 (FIG. 6) and electrical connector 313 provides a communication path between the identity circuit 304 and controller 620. This communication path permits the subscriber information to be downloaded from the SIM to the controller. Additionally, control signals generated by keypad 302 are communicated to the controller 620 responsive to which the communication device 100 operates to send a telephone number or perform some other operation.

Figures 7, 8:
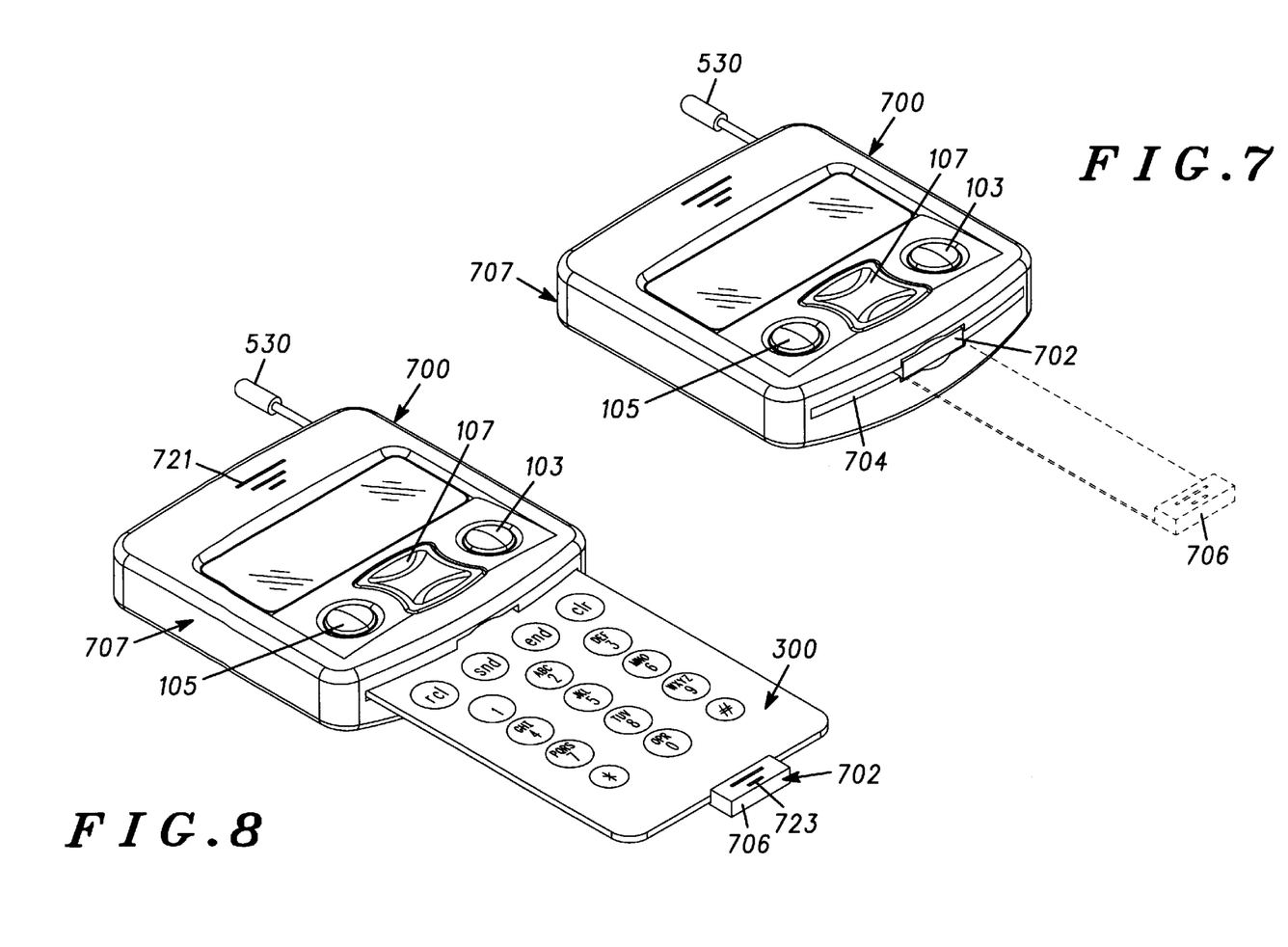
FIG. 7 is a bottom, front, and right side perspective view of a communication device according to an alternate embodiment.
FIG. 8 is a bottom, front and right side perspective view of the communication device according to FIG. 7 with a user interface card attached in the extended position.

A communication device 700 (FIG. 7) according to an alternate embodiment includes a sliding microphone boom 702 which is positioned adjacent a card opening 704. The collapsed, or closed, position of device 700 is illustrated in FIG. 7.

The body 707 includes an aperture 721 to pass sound generated by a speaker therein. The microphone housing 706 includes an aperture 723 through which sound is passed to a microphone positioned therein.

To mount the user interface card 300, the microphone boom 702, which is one housing section of the device, is pulled outwardly from body 707, the other housing section of device 700. The user interface card 300 is inserted into opening 704, as shown in FIG. 8, the open position of communication device 700. When fully inserted, the user interface card 300 will slide in and abut with the inside surface of a microphone housing 706 on the terminating end of microphone boom 702. Microphone housing 706 can include a lip (not shown) that snaps over user interface card 300 to secure the card in engagement with the extended housing section, thus locking the housing in the open use position. The microphone housing 706 is pressed downwardly to permit sliding removal of the user interface card 300 from the device.

Figure 9:
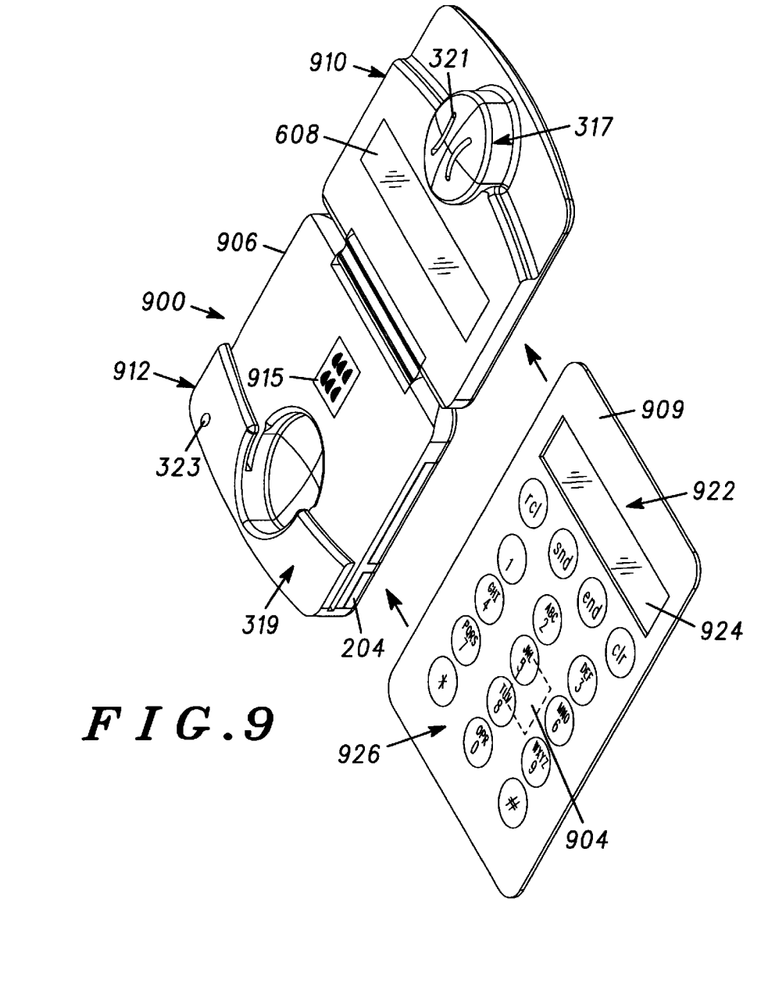
FIG. 9 is a front perspective view illustrating an alternative embodiment of the communication device and user interface card according to FIG. 1.

A communication device 900 according another alternate embodiment is shown in FIG. 9. Device 900 includes housing sections 910 and 912, which are substantially identical to housing sections 110 and 112 of communication device 100. However, housing section 910 includes an optional additional display 608. Housing section 912 includes contacts 915 for connection to the identity circuit 904 in card 922.

Figure 10:
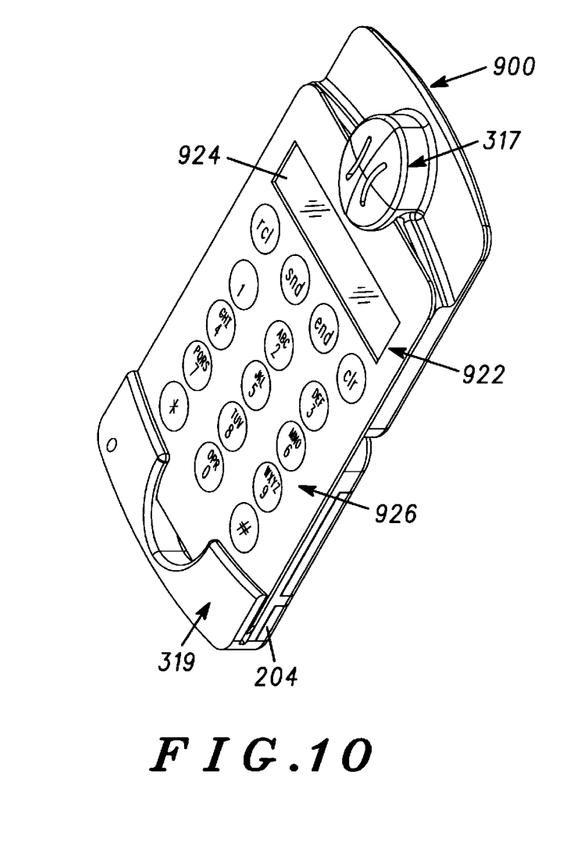
FIG. 10 is a front perspective view illustrating the embodiment according to FIG. 9 with the user interface card attached.

Card 922 includes an aperture 924, which is a hole or a window, located in the card above a keypad 926. The aperture 924 aligns with additional display 608 when the card 922 is fully inserted into the communication device 900 in the open position, shown in FIG. 10. The additional display 608 is thus visible through aperture 924 to permit viewing of the optional additional display 608 while dialing on keypad 926. Aperture 924 may be a hole. However, a translucent or transparent member is preferably provided in body 909 of the card 922 in the aperture. The transparent member can be integrally formed, through a suitable molding process, with the rest of the card body, in aperture 924. The addition of a translucent or transparent member provides integrity and structural strength for the card 922 to help prevent damage to the card while permitting viewing of the optional additional display 608 when the card is inserted in communication device 900.

The identity circuit 904 is coupled to the connector 522 (shown in FIGS. 5 and 6). The identity circuit 904 can include a GSM SIM or a memory circuit of the type used in a bank card. The connector 522 (shown in FIGS. 5 and 6) is for connection to contacts 915 (FIG. 9), which are connected to controller 620 in the same manner as connector 522 in FIG. 6. For GSM cellular phones which require a SIM, the user interface can be provided on the user's SIM card.

By providing the optional additional display 608 on the device and the viewing aperture 924 on the card, a display can be provided which is visible to the user while pressing the keys. This optional display on the housing allows the addition of the display without increasing the thickness of the card to the thickness of a display included on the card.

Figure 11:
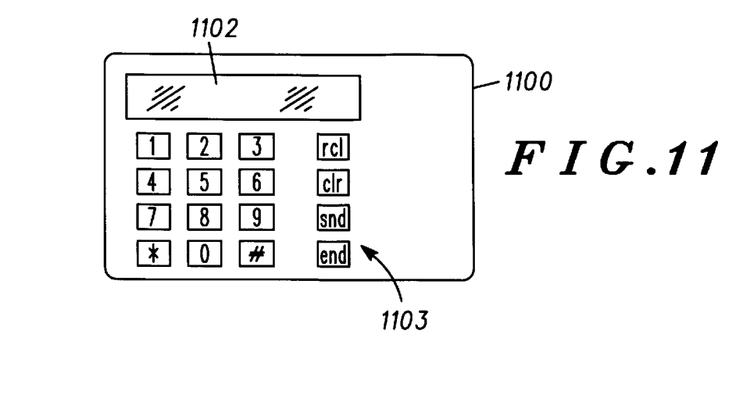
FIGS. 11, 12, 13 and 14 are perspective views illustrating user interface cards that can be utilized in the devices according to FIGS. 1 through 10.

Alternate embodiments of the user interface card are shown in FIGS. 11–14. User interface card 1100, showing FIG. 11, is a phone interface. User interface card 1100 includes a display 1102, or a transparent member for alignment with a display in the communication device 900. The user interface card also includes keys 1103. User interface card 1100 is used in combination with the communication device 100, 900 to provide a phone.

Figure 12:
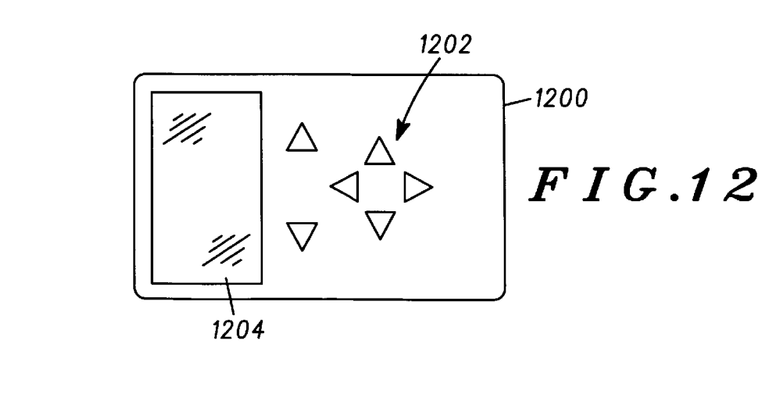

User interface card 1200 is a game card for use with communication device 900 to provide a game. The card includes keys 1202 to provide control inputs for the game operation. User interface card 1200 includes a display 1204, or a viewing window for alignment with a display in the communication device 900, to provide a game display. User interface card 1200 is used in combination with the communication device 100, 900 to provide an electronic game.

Figure 13:
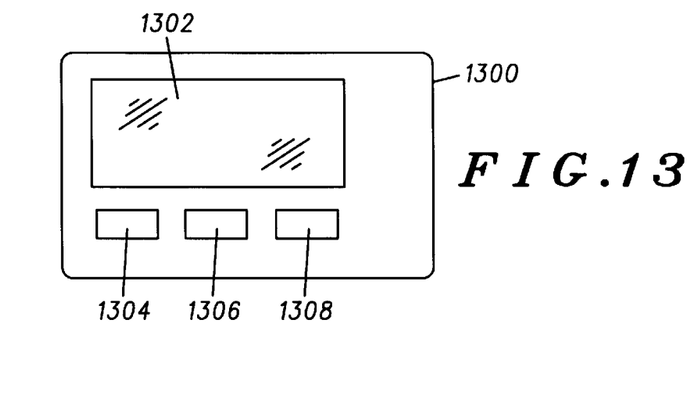

User interface card 1300, including a display 1302 and three control keys 1304, 1306, and 1308, provides a control input for a pager if the keys on the front (illustrated in FIG. 1) do not provide pager control. User interface card 1300 includes a display 1302 or a viewing window for alignment with a display in the communication device 900, to generate paging images. The card is used in combination with the communication device 100, 900 to provide a pager.

Figure 14:
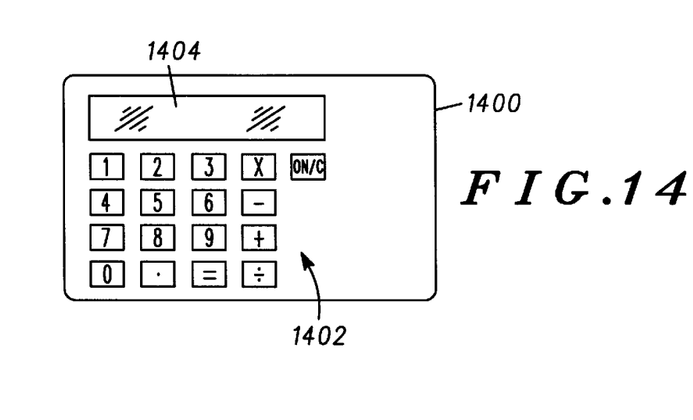

User interface card 1400 provides a calculator function, and thus includes keys 1402. User interface card 1400 includes a display 1404, or a transparent member for alignment with a display in the communication device 900. User interface card 1400 is used in combination with the communication device 100, 900 to provide a calculator.

It is envisioned, for example, that the cards of FIGS. 11–14 can be used with a device having a display approximately the same area as the largest window on the card. The card is placed over the display. The controller 620 detects the card type, and controls the optional additional display 608 to generate an image in the portion of the display corresponding to the card viewing window.

In operation, when the communication devices 100, 700, 900, 1500 receives a paging signal or an incoming call signal from a base station or satellite, an alert is generated for the user. The alert can be in the form of a vibrating alarm or an audible ring. Ideally, distinct alerts for the pager and phone would be provided to indicate that the incoming call signal is a page or a telephone call. The user can read the page by pressing key 105 (FIG. 1) or they can answer a call by opening the device.

It is envisioned that key 107 (FIG. 1) can be used to scroll a menu that includes the paging functions and an emergency number function. In such an embodiment, the emergency number function is selected when it is display by actuating key 103. Key 107 is then used to scroll a list of emergency numbers that is opened upon selecting the emergency number. Once the desired emergency number is displayed, the user selects it using key 103. That emergency number is then dialed.

The user interface card 300 (FIG. 3) including a SIM or SIM card 206 (FIG. 2) is required for making and receiving most calls in systems such as the GSM system. More particularly, the GSM system requires a SIM for phone operation except when a user is placing a call to an emergency number. The emergency number menu can thus be used to make calls without insertion of a card even in such a system.

It will also be recognized that the menu provides the ability to call any numbers stored in memory, even if they are not emergency numbers, without a card being inserted. The communication device 100, 700, 900, 1500 can be used for placing telephone calls to those numbers previously stored in memory (the memory associated with controller 620, FIG. 6). These numbers are scrolled using key 107 and selected using key 103. Such calls can be without inserting the user interface card 200 in systems not requiring a SIM, or if the system requires a SIM, by using SIM card 206.

It is also envisioned that the communication device 100, 700, 900, 1500 could be implemented as a child emergency phone without the use of a card. In such an embodiment, a small child could be paged using the device. Additionally, the child's home telephone number could be exclusively associated with key 107 in a kid mode of operation. Thus, actuation of key 107 would cause the device to call the child's home phone number. A small child could this be taught to use the device It is envisioned that the telephone number menu could automatically be displayed when the communication device 100, 700, 900, 1500 is opened. Thus, when the reed switch 342 (FIG. 5) detects that the device is open, the controller 620 controls the display 102 to generate a phone list, or a single phone number. The user then selects the number using key 103 and/or key 107.

In operation, the communication device 100, 700, 900, 1500 uses information from the user interface cards to operate. In particular, the identity circuit 304 (FIG. 6) provides information to the controller 620 as to the operation of communication device 100, 700, 900, 1500 and the device operates according to this information. For example, if the card is a SIM card, the subscriber information is loaded from the identity circuit 304 to the controller 620. The device communicates this information to a base station.

In other applications, such as the game (FIG. 12) or the calculator (FIG. 14), an identity circuit includes a program stored therein which is downloaded to the controller 620 (FIG. 6). The controller 620 then operates according to the instructions in the program. Thus, each of the cards, 1100 (FIG. 11), 1200 (FIG. 12), 1300 (FIG. 13) and 1400 (FIG. 14) includes an identity circuit an a connector such that the cards can communicate with controller 620.

For phones other than those using a SIM, the identity circuit on the user interface card will instruct the controller 620 (FIG. 6) as to the display size (if the card includes an aperture for alignment with a display on the device) and a keypad input matrix. The keypad input matrix informs the controller as to what the keypad control signals mean. Thus, a numeric digit will be associated with a particular key strike value appearing on the data bus 614, and the controller will know which number the user intended based upon the key strike value.

According to one embodiment of the invention, a user interface card 300 (FIG. 3) and a communication device 100 can be locked to one another. Thus the communication device 100 can have stored in controller 620 (FIG. 6) a control signal, such as a code, a unique signal, or an ID, required by user interface card 300. Similarly, the user interface card 300 can have stored in controller 620 a control signal, such as a code, a unique signal, or an ID, required by communication device 100. These signals are used in a handshaking procedure that takes place between the device and the user interface card to determine whether the card and the device will operate with one another. By insuring that the device and the card know what they are connected to, inter-operability can be maintained. For example, it is envisioned that the device can know that it will receive calls with some conventional large SIM inserted therein, but that the device will only originate calls if a particular SIM is inserted.

Figure 15:
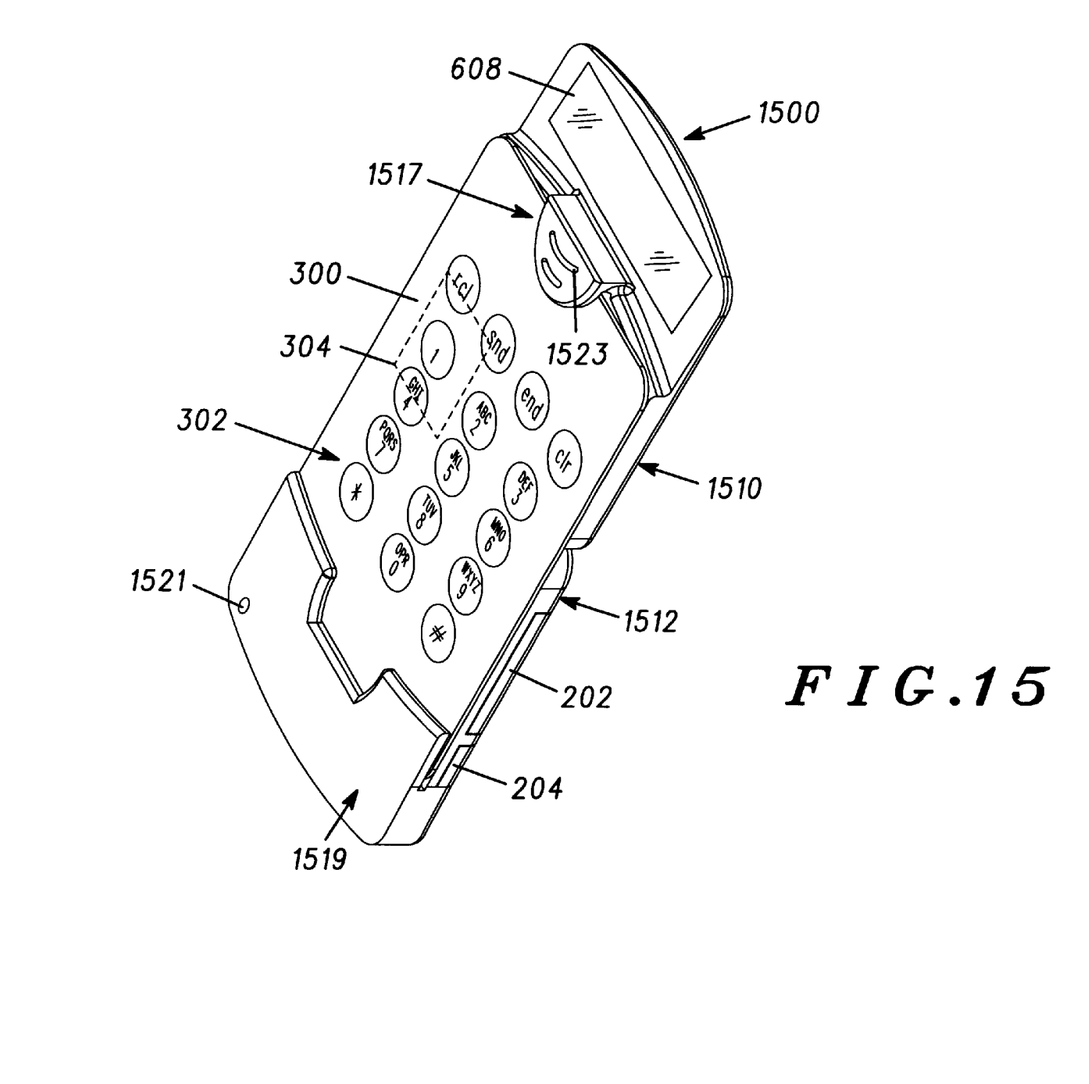
FIG. 15 is a front perspective view illustrating an alternate embodiment of the communication device in the open position with a user interface card attached.

A portable communication device (1500) according to another alternate embodiment is illustrated in FIG. 15. Communication device 1500 includes housing section 1510 and housing section 1512 coupled by a mechanical connector like that in communication device 100. An optional additional display 608 is mounted on housing section 1510 above speaker housing 1517. This additional display 608 is in addition to the large display 102 (FIG. 1). The speaker housing 1517 includes an aperture 1523 for passing sound from a speaker positioned therein. A microphone housing 1519 includes an aperture 1521 for passing sound to a microphone positioned therein.

The user interface card 300 is inserted under an overhang in the speaker housing 1517 and an overhang in microphone housing 1519. The identity circuit 304 connects to the electrical connector 313 (not shown in FIG. 15 as it is under the card, but illustrated in FIG. 3) when the card is fully inserted. The user interface card 300 provides a keypad 302 for the communication device 1500, and holds the housing sections 1510 and 1512 against closing when the card is inserted. Additionally, the optional additional display 608 provided visual feedback to the user while the user actuates keys on keypad 302.

Thus it can be seen that a compact portable communication device is disclosed that is versatile in operation. It folds to a small size for storage. It is opened to receive a larger card. The card has a large surface area on which the user interface is located. The keypad can have larger keys, which are easier to strike, than smaller keys that would be located on the device.

What is claimed is:

1. A user interface card comprising:

a body;

a connector carried on said body and for coupling to a communication device with which said user interface card is used;

a user interface including a keypad carried on said body and coupled to said connector;

an identity circuit coupled to said connector, said identity circuit having a subscriber identity module for use with a cellular telephone; and an aperture in said body for alignment with a display on the communication device with which said user interface card is used.

2. The user interface card as defined in claim 1, wherein said aperture comprises a transparent member in said body.

3. A subscriber identity module card comprising:

a body;

a connector carried on said body and for coupling to a wireless communication device to receive power from the wireless communication device and communicate control signals with the wireless communication device;

a user interface carried on said body, said user interface including a keypad carried on said body and coupled to said connector; and a subscriber identity module carried on said body and connected to said connector, said subscriber identity module including subscriber information used by the wireless communication device to communicate with other devices.

4. The subscriber identity module card as defined in claim 3, wherein said user interface further includes a display.

5. The subscriber identity module card as defined in claim 3, wherein said user interface includes a hole for alignment with a display on the wireless communication device with which subscriber identity module card is used.

6. The subscriber identity module card as defined in claim 3, wherein said user interface includes a transparent member for alignment with a display on the wireless communication device with which said subscriber identity module card is used.

* * * * *